United States Patent
Egashira et al.

(12)

(10) Patent No.: US 8,106,134 B2
(45) Date of Patent: *Jan. 31, 2012

(54) GOLF BALL AND METHOD OF IMPROVING GOLF BALL PERFORMANCE

(75) Inventors: Yoshinori Egashira, Chichibu (JP); Jun Shindo, Chichibu (JP); Eiji Takehana, Chichibu (JP); Takashi Ohira, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 594 days.

This patent is subject to a terminal disclaimer.

(21) Appl. No.: 12/199,990

(22) Filed: Aug. 28, 2008

(65) Prior Publication Data

US 2010/0056299 A1    Mar. 4, 2010

(51) Int. Cl.
*A63B 37/12*    (2006.01)
*A63B 37/00*    (2006.01)
*C08J 7/16*    (2006.01)
*C08J 7/18*    (2006.01)
*B29C 71/00*    (2006.01)

(52) U.S. Cl. ............ 525/447; 264/279; 264/279.1; 264/340; 264/347; 264/446; 264/494; 427/393.5; 427/508; 427/512; 522/116; 522/118; 522/136; 522/141; 522/144; 525/291; 525/293; 525/454; 525/455; 525/457

(58) Field of Classification Search .......... None
See application file for complete search history.

(56) References Cited

U.S. PATENT DOCUMENTS

| | | | |
|---|---|---|---|
| 5,312,690 A * | 5/1994 | Fukuda et al. | 428/447 |
| 5,908,358 A | 6/1999 | Wu | |
| 6,458,307 B2 | 10/2002 | Inoue et al. | |
| 6,582,325 B1 | 6/2003 | Ichikawa et al. | |
| 6,585,607 B2 | 7/2003 | Tzivanis et al. | |
| 6,890,661 B2 | 5/2005 | Pradel | |
| 6,919,395 B2 | 7/2005 | Rajagopalan et al. | |
| 7,001,286 B2 | 2/2006 | Kim et al. | |
| 7,029,405 B2 | 4/2006 | Halko et al. | |
| 7,151,148 B2 | 12/2006 | Lutz et al. | |
| 7,358,310 B2 | 4/2008 | Voorheis | |
| 7,381,776 B2 | 6/2008 | Nanba et al. | |
| 7,387,582 B2 | 6/2008 | Sajima | |
| 7,387,821 B2 | 6/2008 | Isogawa et al. | |
| 2006/0089419 A1* | 4/2006 | Hogge et al. | 522/174 |
| 2009/0124419 A1* | 5/2009 | Sullivan et al. | 473/374 |
| 2010/0056304 A1* | 3/2010 | Egashira et al. | 473/378 |

FOREIGN PATENT DOCUMENTS

| JP | 11-178949 A | 7/1999 |
|---|---|---|
| JP | 2008-049152 A | 3/2008 |

OTHER PUBLICATIONS

O.A. Lam et al., "Homopolymerization and Copolymerization of Isocyanatoethyl Methacrylate", Journal of Polymer Science: Part A: Polymer Chemistry, vol. 44, No. 16, 2006, pp. 4762-2768.

* cited by examiner

*Primary Examiner* — David Buttner
(74) *Attorney, Agent, or Firm* — Sughrue Mion, PLLC

(57) ABSTRACT

A golf ball having a polymer layer that has been subjected to impregnation treatment with an isocyanate and/or isothiocyanate-containing olefin compound exhibits at least one improved golf ball attribute, such as scuff resistance or spin performance, compared with an original golf ball that has not been treated by impregnation.

5 Claims, No Drawings

GOLF BALL AND METHOD OF IMPROVING GOLF BALL PERFORMANCE

BACKGROUND OF THE INVENTION

The present invention relates to a golf ball of improved performance which includes, in a polymer layer making up the golf ball, a layer that has been treated by impregnation with an isocyanate group (here and below, "isocyanate group" encompasses also "isothiocyanate group")-containing olefin compound.

Organic reactive compounds are useful materials in golf balls made with thermoplastic and thermoset polymer materials. Of such compounds, isocyanate group-containing compounds in particular, when blended with a polymer material, are able to modify the properties of the polymer material, and have thus been useful compounds as golf ball modifiers.

Organic reactive compounds are commonly included in polymer materials for golf balls for a variety of purposes. For example, organic peroxides such as dicumyl peroxide and di-t-butylperoxide, epoxy compounds such as bisphenol A diglycidyl ether and polyethylene glycol diglycidyl ether, and acrylate compounds such as 1,4-butanediol diacrylate and triethylene glycol diacrylate are used for crosslinking between polymer molecules. Various compounds, including acid anhydrides such as maleic anhydride and itaconic anhydride, silane compounds such as silsesquioxane oligomer and POSS, and isocyanate compounds such as toluene diisocyanate and 4,4'-diphenylmethane diisocyanate, are used in the presence of a peroxide for the purpose of introducing functional groups onto polymer molecules. Numerous patent applications have been filed concerning the use of such compounds.

Examples include the following, all for the purpose of crosslinking between polymer molecules: Patent Document 1 (U.S. Pat. No. 7,387,821) and Patent Document 2 (U.S. Pat. No. 7,387,582) relating to the use of an organic peroxide, Patent Document 3 (U.S. Pat. No. 5,908,358) and Patent Document 4 (U.S. Pat. No. 7,358,310) relating to the use of an epoxy compound, Patent Document 5 (U.S. Pat. No. 7,151,148) and Patent Document 6 (U.S. Pat. No. 7,001,286) relating to the use of an acrylate compound, Patent Document 7 (U.S. Pat. No. 6,890,661) and Patent Document 8 (U.S. Pat. No. 7,029,405) relating to the use of an acid anhydride, Patent Document 9 (U.S. Pat. No. 6,585,607) and Patent Document 10 (U.S. Pat. No. 6,919,395) relating to the use of a silane compound, and Patent Document 11 (JP-A 11-178949) and Patent Document 12 (JP-A 2008-049152) relating to the use of an isocyanate compound.

As noted above, almost all conventional methods for using organic reactive compounds in the field of golf balls involve blending those compounds with various polymer materials at some stage prior to molding golf balls, thereby modifying the functions of the polymer materials and causing such changes to be reflected in the performance of the molded golf balls.

Yet, a desire has arisen recently for even further improvement in the performance of molded golf balls, such as the feel of the ball on impact, scuff resistance, spin and distance. It is customary to conduct studies on improvements in golf ball performances by reexamining the various polymer materials making up the balls. By contrast, with the exception of certain patents relating to partial surface modification (Patent Document 13: U.S. Pat. No. 6,458,307; Patent Document 14: U.S. Pat. No. 7,381,776), very few of any specific measures targeted at molded golf balls or golf balls in the process of being molded have been employed to date. Hence, this remains an area of untapped potential.

Patent Document 1: U.S. Pat. No. 7,387,821
Patent Document 2: U.S. Pat. No. 7,387,582
Patent Document 3: U.S. Pat. No. 5,908,358
Patent Document 4: U.S. Pat. No. 7,358,310
Patent Document 5: U.S. Pat. No. 7,151,148
Patent Document 6: U.S. Pat. No. 7,001,286
Patent Document 7: U.S. Pat. No. 6,890,661
Patent Document 8: U.S. Pat. No. 7,029,405
Patent Document 9: U.S. Pat. No. 6,585,607
Patent Document 10: U.S. Pat. No. 6,919,395
Patent Document 11: JP-A 11-178949
Patent Document 12: JP-A 2008-049152
Patent Document 13: U.S. Pat. No. 6,458,307
Patent Document 14: U.S. Pat. No. 7,381,776

SUMMARY OF THE INVENTION

It is therefore an object of the present invention to provide a golf ball in which, by using the above-mentioned organic reactive compound to carry out impregnation treatment on a polymer layer making up the golf ball, and in particular a polymer material making up the surface layer of the ball, performance attributes such as scuff resistance and spin have been improved without breaking the golf ball.

The inventors have, in studying the various organic reactive compounds included in golf balls, taken an approach not seen in prior golf ball applications. That is, instead of conducting a study which reexamines the various polymer materials making up the golf ball, the inventors have extensively studied different reactive compounds with the object of improving the performance of the molded golf ball itself. As a result, the inventors have found out that isocyanate group-containing olefin compounds are ideal materials for achieving this object.

Moreover, the inventors have learned from further studies that golf balls which include as a component thereof (here and below, the cover material in a two-piece solid golf ball composed of a core and a cover encasing the core, or the cover material or intermediate layer material in a multi-piece solid golf ball composed of a core of one or more layer, one or more intermediate layer encasing the core, and a cover of one or more layer encasing the intermediate layer) a molded polymer layer that has been by the impregnation treatment with the above-mentioned isocyanate group-containing olefin compound have improved performances and thus excellent properties.

Accordingly, the present invention provides the following golf ball and the method of improving golf ball performances.

[I] A golf ball that includes a polymer layer which has been by the impregnation treatment with an isocyanate and/or isothiocyanate-containing olefin compound.

[II] A method of modifying a golf ball having a polymer layer, which includes the step of impregnating the polymer layer with an isocyanate and/or isothiocyanate-containing olefin compound.

DETAILED DESCRIPTION OF THE INVENTION

The invention is described more fully below.

The present invention provides a golf ball that includes a polymer layer which has been by the impregnation treatment with an isocyanate and/or isothiocyanate-containing olefin compound. In the following description, for the sake of convenience, the isocyanate and/or isothiocyanate-containing olefin compound is referred to simply as the "isocyanate-containing olefin compound."

Also, as used herein, "impregnation treatment" additionally includes, following the impregnation with the organic reactive compound, heat treatment and/or ultraviolet light (UV) irradiation treatments and a period of time elapsed.

The inventors have conducted studies to determine whether, by subjecting the polymer layer of a molded golf ball to the impregnation treatment with an isocyanate group-containing olefin compound, it is possible to improve the performances of the golf ball ultimately obtained.

However, the large number of organic reactive compounds, such as crosslinking agents, which could be used for the impregnation treatment of the thermoplastic and/or thermoset polymer materials in the polymer layer of the golf ball made it impossible to comprehensively examine all such compounds in the studies conducted for this invention.

Therefore, selection of the organic reactive compound was carried out first from a number of initial "decision factors" that include, for example:

(1) compounds which, because of carrying out the impregnation treatment, are liquid, if not necessarily at room temperature, conveniently at near room temperature;
(2) compounds which have two or more reactive groups per molecule (i.e., compounds which have a crosslinking action);
(3) compounds which can be reacted under the influence of heat and/or ultraviolet light; and
(4) compounds which are, in themselves, homopolymerizable.

In addition, the impregnation treatment was carried out on the polymer layer of the golf ball, and the physical properties of the golf ball ultimately obtained, including changes over time, were evaluated.

As a result, the inventors found out that isocyanate-containing olefin compounds are preferred as organic reactive compounds which have the effect of improving the performances (e.g., feel on impact, scuff resistance, spin, distance) of the golf ball ultimately obtained following the impregnation treatment of the thermoset and/or thermoplastic polymer materials making up the polymer layer of a golf ball, and ultimately arrived at the present invention.

The isocyanate-containing olefin compounds of the invention have been found from the studies to have the following characteristics:

(1) the isocyanate group exhibits addition reactivity with amide groups (—NHCO—), urethane groups (—NH-COO—), primary and secondary amino groups (—NH$_2$— and —NH—R, where R is alkyl, aralkyl, allyl, aryl, etc.), hydroxyl groups (—OH) and carboxyl groups (—COOH);
(2) the olefin group (unsaturated bond) such as the acrylic group (CH$_2$═CHCO—), methacrylic group (CH$_2$═C(CH$_3$)CO—), allyl group (CH$_2$═CHCH—) and vinyl group (CH$_2$═CH—) exhibits photocrosslinkability by exposure to ultraviolet light and/or thermal crosslinkability by heat treatment;
(3) the compound exhibits homopolymerizability or copolymerizability (with regard to homopolymerizability and copolymerizability, see *Journal of Polymer Science Part A: Polymer Chemistry* 44 (16), 4762-4768 (2006));
(4) the compound has a good compatibility with urethane materials (including both thermoset and thermoplastic materials), polyester and/or polyether materials and amide materials, and shows a tendency to be easily impregnated therein;
(5) the compound has a poor compatibility with polyethylene materials (including polyethylene, metallocene polyethylene, ethylene-based acid copolymers and ethylene-based ionomers), styrene elastomer materials and diene materials (e.g., BR, NBR, CR), and shows a tendency to be difficult to impregnate therein; and
(6) the compound is liquid at ordinary temperatures (20° C.±15° C.).

Specific examples of the isocyanate-containing olefin compound used in the present invention include, but are not limited to, 2-iso(thio)cyanatoethyl methacrylate, 2-iso(thio)cyanatoethyl acrylate, 3-iso(thio)cyanatopropyl acrylate, 1-methyl-2-iso(thio)cyanatoethyl methacrylate, 1,1-dimethyl-2-iso(thio)cyanatoethyl acrylate, allyliso(thio)cyanate, allylthiocyanate, methylvinyliso(thio)cyanate, vinyliso(thio)cyanate, vinylthiocyanate, bis-(2-iso(thio)cyanatoethyl)fumarate, 2-iso(thio)cyanato-2-methylpropylene glycol diacrylate and 2-(2-iso(thio)cyanatoethoxy)ethyl(meth)acrylate. In addition, illustrative examples of isocyanate group-blocked derivatives formed with isocyanate groups under the application of heat include 2-[O-(1-methylpropylidenamino)-carboxyamino]ethyl(meth)acrylate, 2-(pyrazoyl-1-carbonylamino)ethyl(meth)acrylate and tris(2-acryloyloxyethyl)isocyanurate.

Of the group of above-mentioned isocyanate-containing olefin compounds, from the standpoint of commercial production, 2-isocyanatoethyl methacrylate, 2-isocyanatoethyl acrylate, 3-isocyanatopropyl acrylate and 2-isocyanato-2-methylpropylene glycol diacrylate are preferred. Taking polymerizability into account, 2-isocyanatoethyl acrylate and 2-isocyanato-2-methylpropylene glycol diacrylate are more preferred.

The above isocyanate-containing olefin compound has a melting point of preferably 80° C. or below, more preferably 60° C. or below, and even more preferably 35° C. or below. Isocyanate-containing olefin compounds which are liquid at temperatures near 0 to 35° C. are suitable for the impregnation treatment.

The following conditions (1) to (5) apply to the impregnation treatment of golf balls with the isocyanate-containing olefin compound of the present invention.

(1) The impregnation temperature is preferably as high as possible within a range up to the melting point of the polymer material making up the polymer layer of the golf ball to be impregnated. However, care must be taken with the homopolymerization of the isocyanate-containing olefin compound. It is desirable for the impregnation temperature to be within a range of from about 0° C. to about 100° C., preferably from about 5° C. to about 80° C., and more preferably from about 10° C. to about 50° C.
(2) The impregnation time, which depends on both the type of polymer material making up the polymer layer in the golf ball to be impregnated and the impregnation temperature, is preferably within a range of from about 15 seconds to about 100 hours, more preferably from about 1 minute to about 80 hours, and even more preferably from about 30 minutes to about 50 hours.
(3) Following the impregnation, it is essential to either wipe off, or blow off with an air knife, surplus isocyanate-containing olefin compound adhering to the surface layer of the golf ball. If the isocyanate-containing olefin compound is left adhering to the surface layer of the golf ball, the isocyanate-containing olefin compound homopolymerizes, forming irregularities (a thin, uneven layer) on the surface of the golf ball, which adversely affects the properties of the golf ball.
(4) Carrying out UV irradiation treatment (photocrosslinking) and/or heat treatment (thermal crosslinking) following the impregnation improves the performance of the golf ball. In such a case, the UV irradiation time when using a high-pressure mercury vapor lamp is in a range of from about 5 seconds to about 50 hours, preferably from about 20 seconds to about 25 hours, and more preferably from about 30 seconds to about 10 hours. The irradiation temperature is in a range of from about 0° C. to about 100° C., preferably from about 5° C. to about 80° C., and more preferably from about 10° C. to about 50° C. A higher temperature tends to be better, so long as the temperature is at or below the melting point of the polymer material making up the polymer layer of the golf ball to be impregnated. The heat treatment (thermal crosslinking) temperature is in a range of from about 25° C. to about 100° C., preferably from about 35° C. to about 80° C., and more preferably from about 40° C. to about 60° C. A higher temperature tends to be better, so long as the temperature is at or below the melting point or softening point of the polymer material making up the polymer layer of the golf ball to be impregnated.

(5) Alternatively, the advantageous effects of the invention can be achieved by allowing the golf ball to keep standing without subjecting the ball to the UV irradiation treatment or heat treatment following impregnation. In such a case, a long period of time elapsed of at least about 200 hours is required. For example, it may be necessary to allow the golf ball to keep standing in this way for 30 days (720 hours).

The impregnated layer obtained by the impregnation treatment of the polymer layer of the golf ball with the isocyanate-containing olefin compound of the invention has a thickness, as calculated from the difference in the weight of the golf ball before and after impregnation treatment and the difference in the outermost diameter of the golf ball before and after the impregnation treatment, in a range of preferably from about 5 μm to about 900 μm. The content of the isocyanate-containing olefin compound impregnated into the golf ball is preferably from about 0.01 g to about 7.00 g, and more preferably from about 0.05 g to about 5.00 g.

The difference in hardness, before and after treatment, of the polymer layer obtained by the impregnation treatment of the golf ball with the isocyanate-containing olefin compound in the present invention is dependent on the polymer material making up the impregnated layer of the golf ball, although an increase within a range of from about 1 to about 10 Shore D hardness units is preferred.

No particular limitation is imposed on the polymer material in the polymer layer of the golf ball on which the impregnation treatment with the isocyanate-containing olefin compound of the invention is to be carried out, provided it is a thermoplastic polymer and/or thermoset polymer commonly used in golf balls. Illustrative examples of thermoplastic polymers include polyolefin elastomers (including ethylene ionomers, polyolefins and metallocene polyolefins), polystyrene elastomers, diene polymers, polyacrylate polymers, polyamide elastomers, polyurethane elastomers, polyester elastomers and polyacetals. Illustrative examples of thermoset polymers include thermoset urethanes and silicone polymers.

In the impregnation treatment of the golf ball with the isocyanate-containing olefin compound of the invention, to promote photocrosslinking by UV irradiation treatment or thermal crosslinking by heat treatment of the impregnated isocyanate-containing olefin compound, optional additives can also be suitably included with the isocyanate-containing olefin compound according to the intended application. For example, a photopolymerization initiator (1-hydroxycyclohexyl phenyl ketone, 2-hydroxy-2-methyl-1-phenyl propan-1-one, 2,2-dimethoxy-1,2-diphenylethan-1-one) or a thermal polymerization initiator (diisobutyryl peroxide, diisopropyl peroxydicarbonate, dibenzoyl peroxide) can be added. When these additives are included, the amount of such addition, per 100 parts by weight of the isocyanate-containing olefin compound, is preferably at least 0.1 part by weight, and more preferably at least 0.5 part by weight, but preferably not more than 10 parts by weight, and more preferably not more than 7 parts by weight.

The golf ball used in the present invention is a one-piece solid golf ball, a two-piece solid golf ball composed of a core and a cover encasing the core, or a multi-piece solid golf ball composed of a core of at least one layer, one or more intermediate layers encasing the core, and a cover of at least one layer encasing the intermediate layer. Impregnation treatment of a molded golf ball layer can be carried out in any manufacturing step. In cases where the outermost layer of a commercial golf ball is treated by the impregnation, it is preferable to carry out the impregnation treatment of the golf ball after the surface has been trimmed prior to the final step of topcoating in the manufacturing process.

The weight of the golf ball following the impregnation treatment with the isocyanate-containing olefin compound of the invention is preferably in a range of from about 44.80 g to about 45.60 g.

The outside diameter of the golf ball following the impregnation treatment with the isocyanate-containing olefin compound of the invention is preferably in a range of from about 42.65 mm to about 42.75 mm.

EXAMPLES

The following examples of the invention are provided by way of illustration and not by way of limitation.

Example 1

The following impregnation treatment was carried out using the golf balls A (which refers to the same symbol A in the table; the same applies below) with a spherically trimmed ionomer cover layer which has not been topcoated (surfacemost layer coating) in Table 1 and using 2-isocyanatoethyl acrylate as the isocyanate-containing olefin compound.

Five Golf Ball As were placed in a 500 ml beaker containing about 250 ml of 2-isocyanatoethyl acrylate, continuously the beaker was placed in an aluminum pouch with fastener and sealed, and the golf balls were kept stationary at 23° C. for 10 hours and thereby impregnated. The impregnated Golf Ball As were then removed from the beaker, of which the surfaces were wiped off, and UV irradiation was carried out for one hour at 40° C. with a high-pressure mercury vapor lamp (H40 paint fadeometer, same model as old FM-1, manufactured by Suga Test Instruments Co., Ltd.). The impregnated Golf Ball As were left standing for one day at 23° C., and the surface hardness of the cover layers was measured. In addition, topcoating was carried out, thereby finishing the balls as conventional golf ball products. The physical properties of these golf balls were measured one week later, yielding the results shown in Table 1. All the impregnation treatments prior to UV irradiation were carried out within a draft chamber.

Compared with the golf balls of Comparative Example 1 which were not treated by impregnation, the golf balls of Example 1 which were treated by impregnation with 2-isocyanatoethyl acrylate showed an increase of from 65 to 67 in hardness (Shore D) of the ionomer cover layer's surface, and showed a certain increase in the initial velocity and total distance when the golf balls were hit with a number one wood

Examples 2 and 3

Aside from changing the impregnation time of the Golf Ball A in 2-isocyantoethyl acrylate in Example 1 from 10 hours to 15 hours and 25 hours, respectively, the same procedures were carried out as in Example 1, thereby obtaining each impregnated Golf Ball As of Examples 2 and 3 in the invention. The properties of these golf balls were measured. Those results were shown in Table 1. As in Example 1, compared with Comparative Example 1, the surface hardness (Shore D) of the ionomer cover layer of the two furthermore rose from 65 to 69 and 70, respectively, the initial velocity and total distance of both of the two increased, and their back spins exhibited a desirable decreasing tendency. The golf balls also had an improved scuff resistance.

Example 4

Aside from using the Golf Ball Bs having a urethane/ionomer cover layer instead of the Golf Ball As having an ionomer cover layer used in Example 1, the same procedures were carried out as in Example 1 to give the impregnated Golf Ball Bs of Example 4. The properties of these golf balls were measured. Those results were shown in Table 1. Compared with Comparative Example 2, wherein the impregnation treatment was not carried out, the surface hardness (Shore D) of the urethane/ionomer cover layers increased from 52 to 55, and improvements occurred in the initial velocity, total distance and scuff resistance.

Examples 5 and 6

Aside from using the Golf Ball Cs having a thermoplastic urethane cover layer instead of the Golf Ball As having an ionomer cover layer used in Example 1, and aside from changing the impregnation time of the Golf Ball C in 2-isocyanatoethyl acrylate from 10 hours to 5 hours and 25 hours, respectively, the same procedures were carried out as in Example 1, thereby giving the impregnated Golf Ball Cs in Examples 5 and 6. The properties of these golf balls were measured. Those results were shown in Table 1. Compared with Comparative Example 3, in which the golf balls were not treated by impregnation, the surface hardness (Shore D) of the thermoplastic urethane cover layers rose from 57 to 60 and 64, respectively. Those initial velocity, total distance and scuff resistance also increased.

Example 7

Aside from using the Golf ball Ds having a thermoset urethane cover layer instead of the Golf Ball Cs having a thermoplastic urethane cover layer used in Example 6, and aside from using 2-isocyanatoethyl methacrylate containing a 3.5 wt % photocatalyst Irgacure 184 (available from Ciba-Geigy) instead of 2-isocyanatoethyl acrylate, with changing both the impregnation time from 25 hours to 10 hours and the UV irradiation time from 1 hour to 0.5 hour, the same procedures were carried out as in Example 6, thereby giving the impregnated Golf Ball Ds in Example 7. The properties of these golf balls were measured. Those results were shown in Table 1. Compared with Comparative Example 4, in which the golf balls were not treated by impregnation, the surface hardness (Shore D) of the thermoset urethane cover layers rose from 54 to 58. Those initial velocity, total distance and scuff resistance also increased.

Example 8

Aside from using the Golf Ball Es having a polyoxymethylene ionomer cover layer instead of the Golf Ball Ds having a thermoset urethane cover layer used in Example 7, the same procedures were carried out as in Example 7, thereby giving the impregnated Golf Ball Es in Example 8. The properties of these golf balls were measured. Those results are shown in Table 1. Compared with Comparative Example 5, in which the golf balls were not treated by impregnation, the surface hardness (Shore D) of the polyoxymethylene ionomer cover layers rose from 64 to 67. Those initial velocity, total distance and scuff resistance also increased.

Example 9

Aside from using the one-piece Golf Ball Fs having a polybutadiene layer instead of the Golf Ball Ds having a thermoset urethane cover layer used in Example 7, the same procedures were carried out as in Example 7, thereby giving the impregnated one-piece Golf Ball Fs of Example 9. The properties of these golf balls were measured. Those results were shown in Table 1. Compared with Comparative Example 6, in which the golf balls were not treated by impregnation, the surface hardness (Shore D) of the polybutadiene layers rose from 51 to 54. Those initial velocity, total distance and scuff resistance also increased.

Comparative Example 1

For the purpose of comparison with Examples 1 to 3 of the invention, the Golf Ball As having the ionomer cover layer used in Examples 1 to 3 were not subjected to impregnation treatment with 2-isocyanoethyl acrylate, although the procedures following UV irradiation in Example 1 were carried out, thereby giving the Golf Ball As having an ionomer cover layer in Comparative Example 1. The properties of these golf balls were measured, and those results were shown in Table 2.

Compared with Examples 1 to 3, the surface hardness was low and the ball properties were inferior.

Also, on comparing the properties of the Golf Ball As having a UV-irradiated ionomer cover layer obtained in Comparative Example 1 and the Golf Ball As having an original ionomer cover layer that was not UV irradiated, no substantial difference between the two was observed, indicating that UV irradiation did not affect the ball properties.

Comparative Examples 2 to 6

Comparative Examples 2 to 6 correspond respectively to, and serve as controls for, Examples 4 to 9. In these comparative examples, golf balls were obtained by carrying out the same procedures as in Comparative Example 1; that is, without carrying out the impregnation treatment, using 2-isocyanatoethyl acrylate or 2-isocyanatoethyl methacrylate, of the golf balls having a polymer material cover layer used lo in the respective examples of the invention. The properties of these golf balls were measured. Those results were shown in Table 2. The UV irradiation time was one hour in Comparative Examples 2 and 3, and was 0.5 hour in Comparative Examples 4 to 6.

The golf balls in the respective comparative examples had lower surface hardnesses and inferior ball properties when compared with the golf balls obtained in the corresponding examples of the invention.

In addition, on comparing the properties of the UV-irradiated golf balls from Comparative Examples 2 to 6 with the properties of the respective original and non-UV irradiated golf balls, no differences therebetween were observed.

A) Ionomer-Covered GB (3-Piece Golf Ball)
Ionomer cover blend composition:
S8940/(S9945+S9910)/titanium oxide/blue pigment=50/50/3/0.02 parts by weight

TABLE 1

| | Example | | | | | | | | |
|---|---|---|---|---|---|---|---|---|---|
| | 1 | 2 | 3 | 4 | 5 | 6 | 7 | 8 | 9 |
| F) BR-One-piece GB | | | | | | | | | F |
| E) POM Ionomer-covered GB | | | | | | | | E | |
| D) Thermosetting PU-covered GB | | | | | | | D | | |
| C) Thermoplastic PU-covered GB | | | | | C | C | | | |
| B) Thermoplastic PU/Ionomer-covered GB | | | | B | | | | | |
| A) Ionomer-covered GB | A | A | A | | | | | | |
| Isocyanate compound | | 2-Isocyanatoethyl acrylate | | | | | 2-Isocyanatoethyl methacrylate* | | |
| Impregnation time (h) | 10 | 15 | 25 | 10 | 5 | 25 | 10 | 10 | 10 |
| Cover surface hardness of impregnated layer (Shore D) | 67 | 69 | 70 | 55 | 60 | 64 | 58 | 67 | 54 |
| Ball diameter (mm) | 42.69 | 42.73 | 42.75 | 42.75 | 42.68 | 42.74 | 42.72 | 42.74 | 42.71 |
| Ball weight (g) | 45.38 | 45.46 | 45.55 | 45.56 | 45.27 | 45.54 | 45.51 | 45.59 | 45.62 |
| Deflection (mm) | 3.22 | 3.20 | 3.19 | 3.08 | 2.59 | 2.61 | 2.91 | 2.77 | 2.81 |
| Scuff resistance | 3 | 2 | 1 | 2 | 2 | 1 | 1 | 2 | 1 |
| Initial velocity (m/sec) | 63.7 | 64.0 | 64.1 | 64.3 | 63.7 | 65.1 | 64.9 | 65.1 | 64.3 |
| Back spin (rpm) | 3270 | 3210 | 3140 | 3110 | 3220 | 2830 | 2610 | 2760 | 3480 |
| Carry (m) | 204 | 204 | 205 | 203 | 203 | 203 | 208 | 213 | 207 |
| Total distance (m) | 223 | 224 | 225 | 221 | 221 | 223 | 227 | 222 | 220 |

*2-Isocyanatoethyl methacrylate includes a 3.5 wt % 1-hydroxycyclohexyl phenyl ketone (Irgacure 184)

TABLE 2

| | Comparative Example | | | | | |
|---|---|---|---|---|---|---|
| | 1 | 2 | 3 | 4 | 5 | 6 |
| F) BR-One-piece GB | | | | | | F |
| E) POM Ionomer-covered GB | | | | | E | |
| D) Thermosetting PU-covered GB | | | | D | | |
| C) Thermoplastic PU-covered GB | | | C | | | |
| B) Thermoplastic PU/Ionomer-covered GB | | B | | | | |
| A) Ionomer-covered GB | A | | | | | |
| Cover surface hardness of impregnated layer (Shore D) | 65 | 52 | 57 | 54 | 64 | 51 |
| Ball diameter (mm) | 42.66 | 42.75 | 42.64 | 42.67 | 42.70 | 42.67 |
| Ball weight (g) | 45.32 | 45.56 | 45.16 | 45.33 | 45.51 | 45.58 |
| Deflection (mm) | 3.23 | 3.08 | 2.57 | 2.89 | 2.73 | 2.81 |
| Scuff resistance | 3 | 3 | 3 | 2 | 3 | 2 |
| Initial velocity (m/sec) | 63.5 | 64.0 | 63.6 | 64.7 | 64.8 | 64.0 |
| Back spin (rpm) | 3300 | 3210 | 3270 | 2730 | 2880 | 3650 |
| Carry (m) | 203 | 202 | 203 | 207 | 211 | 206 |
| Total distance (m) | 221 | 219 | 220 | 225 | 220 | 218 |

* 2-Isocyanatoethyl methacrylate includes a 3.5 wt % 1-hydroxycyclohexyl phenyl ketone (Irgacure 184)

Details on the materials and methods of measurement in above Tables 1 and 2 are given below.

The core mentioned above (crosslinked BR body) was produced from the following composition.

| | |
|---|---|
| 1,4-cis-Polybutadiene rubber | 100 parts by weight |
| Zinc acrylate | 21 parts by weight |
| Zinc oxide | 5 parts by weight |
| Barium sulfate | 26 parts by weight |
| Dicumyl peroxide | 0.8 part by weight |

S8940, S9945, S9910 (ionomers produced by DuPont)
Titanium oxide (Tipaque 740, produced by Ishihara Sangyo Kaisha, Ltd.)
Blue pigment (Pigment Blue 29, produced by Toyo Ink Mfg. Co., Ltd.)

B) Thermoplastic PU/Ionomer-Covered GB (2-Piece Golf Ball)
Thermoplastic urethane/ionomer cover blend composition:
Thermoplastic urethane/Mg-ionomer/titanium oxide/blue pigment=20/80/3/0.02 parts by weight
Thermoplastic urethane (aliphatic urethane, produced by DIC Bayer Polymer Ltd.)

Mg-Ionomer (Bridgestone Sports BSP experimental product)
Titanium oxide (Tipaque PF740, produced by Ishihara Sangyo Kaisha, Ltd.)
Blue pigment (Pigment Blue 29, produced by Toyo Ink Mfg. Co., Ltd.)
C) Thermoplastic PU-Covered GB (2-Niece Golf Ball)
Thermoplastic urethane cover blend composition:
Aliphatic urethane/titanium oxide/blue pigment=100/3/0.02 parts by weight
Aliphatic urethane (DIC Bayer Polymer Ltd.)
Titanium oxide (Tipaque PF740, produced by Ishihara Sangyo Kaisha, Ltd.)
Blue pigment (Pigment Blue 29, produced by Toyo Ink Mfg. Co., Ltd.)
D) Thermosetting PU-Covered GB (2-Piece Golf Ball)
Thermoset urethane cover blend composition:
PTMG (polytetramethylene ether glycol)-MDI (diphenylmethane diisocyanate) urethane prepolymer (NCO, 7.5 wt %)/4,4'-methylenebis-(2,6-diethyl)aniline/N,N'-dimethylamino-diphenylmethane/trimethylolpropane/titanium oxide/blue pigment=100/50/50/3/3/0.02 parts by weight
PTMG-MDI urethane prepolymer (an aromatic urethane produced by DIC Bayer Polymer Ltd.)
4,4'-Methylenebis-(2,6-diethyl)aniline (Junsei Chemical Co.)
N,N'-Dimethylamino-diphenylmethane (Junsei Chemical Co.)
Trimethylolpropane (Mitsubishi Gas Chemical Co., Ltd.)
Titanium oxide (Tipaque PF740, produced by Ishihara Sangyo Kaisha, Ltd.)
Blue pigment (Pigment Blue 29, produced by Toyo Ink Mfg. Co., Ltd.)
E) POM/Ionomer-Covered GB (2-Piece Golf Ball)
Polyoxymethylene/ionomer blend composition:
Polyoxymethylene/Na-ionomer/Zn-ionomer/titanium oxide/blue pigment=5/50/45/3/0.02 parts by weight
Polyoxymethylene (AMILAS S761, produced by Toray Industries, Inc.)
Na-Ionomer (S8940, produced by DuPont)
Zn-Ionomer (S9910, produced by DuPont)
Titanium oxide (Tipaque PF740, produced by Ishihara Sangyo Kaisha, Ltd.)
Blue pigment (Pigment Blue 29, produced by Toyo Ink Mfg. Co., Ltd.)
F) BR One-Piece GB
Polybutadiene blend composition:
Polybutadiene/zinc acrylate/zinc oxide/barium sulfate/peroxide=100/20/5/15/0.8 parts by weight
Polybutadiene (BR01, produced by JSR Corporation)
Zinc acrylate (Nippon Shokubai Co., Ltd.)
Zinc oxide (Sakai Chemical Industry Co., Ltd.; average particle size, 0.5 μm)
Barium sulfate (Sakai Chemical Industry Co., Ltd.; average particle size, 0.1 μm)
Peroxide (NOF Corporation; dicumyl peroxide)
Deflection
The golf ball was placed between two steel plates, and the deflection (mm) by the ball when compressed under a final load of 1,275 N (130 kgf) from an initial load of 98 N (10 kgf) was measured. This test was carried out at 23±1° C.

Scuff Resistance
The golf balls were held at a temperature of 23±1° C. and hit at a head speed of 33 m/s using a pitching wedge mounted on a swing robot machine, after which damage from the impact was visually rated according to the following scale.
Best: 1 point
Better: 2 points
Good (ordinary): 3 points
Poor: 4 points
Poorer: 5 points
Poorest: 6 points
Initial Velocity, Back Spin, Carry and Total Distance
A golf ball was hit at a head speed of 46 m/sec with a number one wood using a swing machine, and the initial velocity, carry, total distance and back spin of the ball following impact were measured.

The invention claimed is:

1. A method of modifying a golf ball comprising a core and a cover of a polymer layer, the method comprising the step of impregnating the cover layer with an olefin compound having a group selected from among an isocyanate group, an isothiocyanate group, an isocyanate group-blocked portion formed with isocyanate group under the application of heat, and an isothiocyanate group blocked portion formed with isothiocyanate group under the application of heat;
wherein the step of impregnating the cover layer is carried out at an impregnation temperature that does not exceed the melting point and/or softening point of the polymer material in the cover layer, and for an impregnation time in a range of from about 15 seconds to about 100 hours; and
following the step of impregnating the cover layer, surplus isocyanate and/or isothiocyanate-containing olefin compound adhering to the cover layer of the golf ball is either wiped off or blown off with an air knife.

2. The golf ball modifying method of claim 1, wherein, following the step of impregnating the polymer layer with an isocyanate and/or isothiocyanate-containing olefin compound, the golf ball is left to stand for at least 200 hours without carrying out a photopolymerization step by exposure to ultraviolet light or a thermal polymerization step by heat treatment.

3. The golf ball modifying method of claim 1 which additionally comprises, following the step of impregnating the polymer layer with an isocyanate and/or isothiocyanate-containing olefin compound, the step of photopolymerizing by exposure to ultraviolet light and/or the step of thermal polymerizing by heat treatment.

4. The golf ball modifying method of claim 3, wherein the step of photopolymerizing by exposure to ultraviolet light is carried out at a ultraviolet irradiation temperature in a range of from about 0° C. to about 100° C. and for an ultraviolet irradiation time in a range of from about 5 seconds to about 50 hours.

5. The golf ball modifying method of claim 3, wherein the step of thermal polymerizing by heat treatment is carried out after the step of photopolymerizing by exposure to ultraviolet light, at a temperature in a range of from about 25° C. to about 100° C., and for a heat treatment time in a range of from about 5 seconds to about 50 hours.

* * * * *